United States Patent Office 3,463,818
Patented Aug. 26, 1969

3,463,818
UNSATURATED ALDEHYDES AND ALCOHOLS
Jack H. Blumenthal, Oakhurst, N.J., assignor to International Flavors & Fragrances Inc., New York, N.Y., a corporation of New York
No Drawing. Filed Jan. 25, 1966, Ser. No. 522,844
Int. Cl. C07c 47/20
U.S. Cl. 260—601    7 Claims This invention relates to a process for producing α-methylene- and α-methyl-aldehydes and -alcohols and derivatives thereof, useful as perfumes; and to the products so produced.

Preparation of α-methylene aldehydes of low molecular weight has been described in the literature by M. I. Faberov, G. S. Mironov and N. A. Korshunov in C.A. 59, 394 (1962). Equimolecular weights of the reactant aldehyde and secondary amine were used in the reaction.

I have found, in accordance with my invention, a process which employs only catalytic amounts of secondary amine in the reaction of formaldehyde with an aldehyde. I have also found that instead of using a secondary amine, I may substitute another nitrogenous base such as ammonium compound, or a primary amine. With regard to the use of primary amines and ammonia and salts thereof as reactants, these may be used in catalytic or any other suitable proportions. I believe that I am the first to employ these last named reactants in the reaction.

An object of this invention is to provide a simple, efficient process for the production of such α-methylene and α-methyl aldehydes and alcohols, and to produce a series of novel products.

The invention comprises the novel products as well as the novel processes and steps of processes according to which such products are manufactured, the specific embodiments of which are described hereinafter by way of example, and in accordance with which I now prefer to practice the invention.

I have also found in accordance with my invention a series of novel compounds, as follows:

3,7-dimethyl-2-methylene-6-octenal, having the formula:

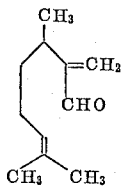

2,3,7-trimethyl-6-octenal, having the formula:

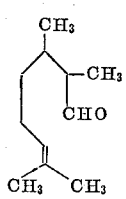

3,7-dimethyl-2-methylene-6-octenol, having the formula:

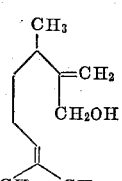

2,3,7-trimethyl-6-octenol, having the formula:

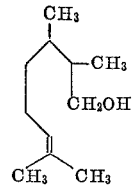

2,3,7-trimethyl octanol, having the formula:

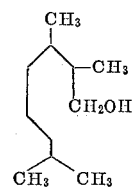

2,3,7-trimethyl octanal, having the formula:

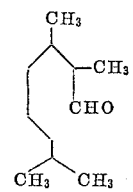

2-methylene-dodecanal, having the formula:

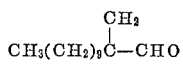

$$CH_3(CH_2)_9\overset{CH_2}{\underset{}{C}}{-}CHO$$

3,7-dimethyl-2-methylene-7-hydroxy octanal, having the formula:

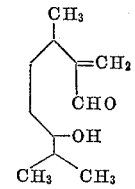

2,3,7-trimethyl-7-hydroxy-octanal, having the formula:

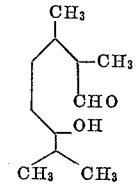

2-methylene undecanal having the formula

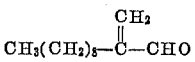

$$CH_3(CH_2)_8\overset{CH_2}{\underset{}{\overset{\|}{C}}}{-}CHO$$

2-methylene-10-undecenal having the formula

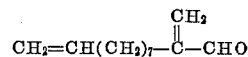

$$CH_2{=}CH(CH_2)_7\overset{CH_2}{\underset{}{\overset{\|}{C}}}{-}CHO$$

3,5,5-trimethyl-2-methylene hexanal having the formula

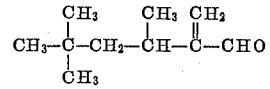

$$CH_3\overset{CH_3}{\underset{\underset{CH_3}{|}}{\overset{|}{C}}}{-}CH_2{-}\overset{CH_3}{\underset{}{\overset{|}{C}H}}{-}\overset{CH_2}{\underset{}{\overset{\|}{C}}}{-}CHO$$

In carrying out a process for manufacturing compounds of this type I may employ the reaction using either catalytic or greater quantities of the amine. In carrying out this process I react an aldehyde having the formula R·CH₂·CHO, where R is an alkyl group having 5 to 10 carbon atoms, e.g. citronellal, with a secondary amine, e.g. diethylamine, and formaldehyde in an aqueous medium to produce α-methylene citronellal. Other substances above mentioned may be made in a similar manner. Instead of the secondary amine I may employ ammonia and salts thereof or a primary amine.

The α-methyl compounds mentioned above may be prepared from the corresponding α-methylene compounds, for example by hydrogenation of the methylene group or reduction of the carbonyl group, or both of these groups. All of the new compounds herein claimed have odors useful as perfumes.

In carrying out the process a pH range from 3 to 9 has been found to give satisfactory yields.

The following are examples of the manner in which I now prefer to practice the invention. It is to be understood that these examples are illustrative of the invention, and are not intended to limit its scope, except as indicated in the appended claims.

In Example I below a one-step reaction is exemplified, using molar quantities of the reactants. Example II shows the same reactants, but using a catalytic quantity of diethylamine, namely a molar ratio of aldehyde to secondary amine of 10:1. Other examples also use catalytic quantities.

EXAMPLE I

A mixture of 18 moles of n-decanal, 20 moles of dimethylamine, 20 moles of 37% formaldehyde, 10 moles of sulfuric acid, 2 liters of water and 10 g. of Ionol was adjusted to pH 3.7 and refluxed for 2.5 hours. At this point, only a trace of the starting aldehyde was present by GLC (Gas Liquid Chromatography). After cooling, the oil layer was sepaarted and the aqueous layer extracted with benzene. The combined organic layer was washed neutral with water and the solvent stripped off. The crude oil was rushed-over to yield 2532 g. of 2-methylene decanal testing 91.2% (by oximation) (76% yield of theory based on n-decanal).

EXAMPLE II

A mixture of 1 mole of n-decanal, 1 mole of 37% formaldehyde, 0.1 mole of diethylamine, 1 g. of Ionol and 17 cc. of water was adjusted to pH 6 with sulfuric acid and then heated in a stirred autoclave for 3 hours at 120° C. The oil layer was separated and washed neutral with water. The crude reaction mixture weighed 190 g. and contained 58% of 2-methylene decanal (by oximation). GLC indicated one major peak with only a trace of the starting aldehyde (65% of theory based on n-decanal).

The course of the reaction in the above example is as follows:

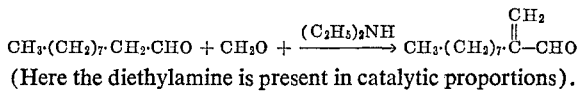

(Here the diethylamine is present in catalytic proportions).

EXAMPLE III

To a solution of 4265 g. of water and 1220 g. of concentrated $H_2SO_4$ was added 1750 g. diethylamine, 1200 g. 37% formaldehyde, 2266 g. of citronellal (81%) and 24 g. of Ionox. The pH was adjusted to 5.1 and the mixture was heated in a stirred autoclave for 4 hours at 120° C. The oil layer was separated and washed with water to yield 1820 g. of product containing 8.8 moles of 3,7-dimethyl-2-methylene-6-octenal (by oximation). Fractionation gave the pure product 3,7-dimethyl-2-methylene-6-octenal, B.P. 84 at 7 mm., $n_D^{20}$ 1.4652, $D_{20}$ 0.8708. It is a perfume having an odor characterized as a powerful citrus fruit aroma very reminiscent of bergamot, and much less coarse than citronellal.

EXAMPLE IV

A solution of 957 g. of 3,7-dimethyl-2-methylene-6-octenal (prepared as in Example III) in 957 cc. of isopropanol was hydrogenated at 20° C. and 115 lbs. of hydrogen pressure to an uptake of 1 mole of hydrogen, using 45 g. Raney nickel as catalyst. After filtration and removal of the solvent, the crude product was fractionated to give 2,3-7-trimethyl-6-octenal, B.P. 80°/5 mm., $n_D^{20}$ 1.4511, $D_{20}$ 0.8613. This product has a fresh, citral-bergamot odor.

EXAMPLE V

To 505 g. methanol, 190 g. water, 34.7 g. $NaBH_4$ and 2 g. of a 25% NaOH solution was added with cooling and stirring at 20° C. over a period of 1 hour, 247 g. of 3,7-dimethyl-2-methylene-6-octenal (87% aldehyde) prepared as in Example III. The reaction mixture was stirred for another 20 minutes. An equal volume of water was added and the oil layer separated. The aqueous layer was extracted with benzene and a combined organic layer washed with water and the solvent stripped off. The crude product was fractionated to yield pure 3,7-dimethyl-2-methylene-6-octenal, B.P. 102° C. at 4.7 mm., $n_D^{20}$ 1.4698, $D_{20}$ 0.8769. This product is a perfume having an odor characterized as a floral, rose-muget odor.

EXAMPLE VI

The reduction of 54 g. of 2,3,7-trimethyl-6-octenal prepared as in Example IV with sodium borohydride following the procedure as in Example IV with sodium borohydride following the procedure of Example V yielded 49 g. of crude product which was fractionated to yield 2,3-7-trimethyl-6-octenol, B.P. 96 at 3 mm., $n_D^{20}$ 1.4604, $D_{15}^{15}$ 0.8681

The product is a perfume having a very fine, clean rose odor similar to citronellol, and perhaps a little brighter.

EXAMPLE VII

A mixture of 100 g. of 3,7-dimethyl-2-methylene-6-octenal, 100 cc. of isopropanol and 5 g. of Raney nickel was hydrogenated in a 300 cc. stirred autoclave at 45° C. and 1500 lb. hydrogen pressure, to no further uptake of hydrogen. The crude product after filtration and stripping of the solvent was fractionated to yield 2,3,7-trimethyl octenal, B.P. 91 at 3 mm., $n_D^{20}$ 1.4424, $D_{20}$ 0.8418. This product is a perfume having a rose aroma.

EXAMPLE VIII

Hydrogenation of 3,7 - dimethyl-2-methylene-6-octenal in ethanol solution using palladium on calcium carbonate as catalyst at 40 lbs. pressure and 25–35° C. yielded the saturated aldehyde. Fractionation gave 2,3,7-trimethyl octanal, B.P. 77 at 5 mm., $n_D^{20}$ 1.4338. This product has a rosy, oily, citronella-like odor.

EXAMPLE IX

A mixture of 1 mole of n-octanal, 100 g. of 37% formaldehyde, 0.1 mole diethylamine, 17 cc. water and 1 g. Ionol was adjusted to pH 6 with sulfuric acid and heated in a stirred autoclave for 3 hours at 120° C. The oil layer was separated and washed neutral with water. GLC indicated one major peak with the absence of the starting aldehyde. The crude product was rushed-over to yield 98 g. which contained 91.4% of 2-methylene octanal (by oximation).

EXAMPLE X

Following the preceding example, except using 1 mole of n-dodecanal in place of n-octanal, yielded after rush-over, 116 g. of product containing 97% of 2-methylene dodecanal (by oximation). GLC indicated the absence of the starting aldehyde. Fractionation yielded the pure aldehyde, $n_D^{20}$ 1.4510, B.P. 105/2.5 mm., $D_{20}$ 0.8496. This product is a perfume having a fatty, floral odor.

EXAMPLE XI

A mixture of 1 mole of citronellal, 0.2 mole diethylamine, 110 g. of 37% formaldehyde, 17 cc. water and 1 g. of Ionol was adjusted to pH 6 with sulfuric acid and heated in a stirred autoclave for 3 hours at 130° C. The oil layer was separated, washed neutral and rushed-over to yield 140 g. of product containing 80% aldehyde (by oximation). GLC indicated that the aldehyde mixture consisted of 94% 3,7-dimethyl-2-methylene-6-octenal and 6% of the starting aldehyde.

EXAMPLE XII

A mixture of 5 moles of 3,7-dimethyl octanal, 1780 g. water, 730 g. diethylamine, 500 g. of 37% formaldehyde and 10 g. Ionox was adjusted to pH 6.5 with sulfuric acid and heated in a stirred autoclave for 2.5 hours at 120° C. The oil layer was separated and washed neutral with water and rushed-over to yield 606 g. of crude product testing 93% (by oximation). GLC indicated the absence of the starting aldehyde. Fractionation gave 3,7-dimethyl-2-methylene-octanal, B.P. 62° C. at 2.4 mm., $n_D^{20}$ 1.4452. This product has a citrus, fruity-floral, citronellal-like odor.

EXAMPLE XIII

A mixture of 470 g. of 3,7-dimethyl-7-hydroxy-octanal (98.4%), 439 g. of diethylamine, 240 g. of 37% formaldehyde, 1110 ml. of water, and 4.8 g. Ionol was adjusted to pH 6.5 with sulfuric acid and heated in a stirred autoclave for 4 hours at 120° C. The oil layer was separated, washed neutral with water and rushed-over to give 398 g. of distilled product which contained only a trace of the starting aldehyde by GLC. Fractionation gave 3,7-dimethyl-2-methylene-7-hydroxy-octanal, B.P. 103 at 0.8 mm., $n_D^{20}$ 1.4679. This product is a perfume having an attractive floral muget color.

EXAMPLE XIV

The unsaturated aldehyde from the previous example was hydrogenated using 5% palladium on calcium carbonate as catalyst at 30° C. and 40 lb. pressure to an uptake of 1 mole of hydrogen. The crude product was fractionated to yield 2,3,7-trimethyl-7-hydroxy-octanal, B.P. 102 at 1 mm., $n_D^{20}$ 1.4527. This product is a perfume having an odor characterized as a fine floral odor.

EXAMPLE XV

A mixture of 1 mole of n-decanal, 120 g. of 37% formaldehyde solution 10 g. of ammonium chloride and 2 g. of Ionol was heated with stirring at reflux for 4 hours. After cooling and separation, the organic layer was washed once with salt water and then rushed-over to yield 113 g. of product which contained 93.5% of 2-methylene decanal (by oximation). GLC showed only one peak with the absence of the starting aldehyde.

EXAMPLE XVI

A mixture of 1 mole of n-decanal, 120 g. of 37% formaldehyde solution, 12 g. of ammonium acetate, 100 g. of acetic acid and 2 g. of Ionol was refluxed for 1.3 hours. After cooling and separation, the water layer was extracted with benzene and the combined organic layers washed with salt solution. After stripping off the benzene, the residue was rushed-over to yield 117 g. of product testing 88.8% as 2-methylene decanal (by oximation). GLC indicated the presence of only a trace of the starting aldehyde.

EXAMPLE XVII

A mixture of 140 g. of 96.5% pure heptanal, 130 g. of 37% formaldehyde soltuion, 100 g. of acetic acid and 10 g. of ammonium acetate was refluxed for 3½ hours. After cooling and separation of the water layer the organic layer was washed neutral and rushed-over to yield 115 g. of product testing 91.3% as 2-methylene heptanal (by oximation). GLC indicated only a trace of the starting aldehyde.

EXAMPLE XVIII

A mixture of 875 g. of undecanal (97%), 600 g. of 37% formaldehyde, 70 g. of methylamine hydrochloride and 10 g. of Ionol was adjusted to pH 7 with sodium hydroxide and heated for 2 hours at 120° C. in a stirred autoclave. After separation the oil layer was washed neutral and rushed-over to yield 495 g. of product testing 85% as 2-methylene undecanal (by oximation). GLC indicated only a trace of this starting aledhyde. Fractionation yielded the pure product, B.P. 100° C. at 4.2 mm., $n_D^{20}$ 1.4481, $D_{20}$ 0.8469. This product has an oily, green, fresh floral odor.

EXAMPLE XIX

To a mixture of 568 g. of ice and 155 g. of concentrated $H_2SO_4$ was added with cooling 219 g. of diethylamine. The solution was adjusted to pH 4 and 522 g. of 10-undecenal, 5 g. of Ionol and 243 g. of 37% formaldehyde solution was added. The mixture was heated in a stirred autoclave for 2 hours at 120° C. After cooling, the organic layer was separated, washed neutral and rushed-over to yield 358 g. crude distillate. Fractionation yielded 308 g. of 2-methylene-10-undecenal, B.P. 92° C. at 3 mm., $n_D^{20}$ 1.4590. GLC indicated only a trace of the starting aldehyde. The product had a natural, waxy rose odor.

EXAMPLE XX

A mixture of 30 g. of 3,5,5-trimethyl hexanal (95%), 38 g. of dimethylamine hydrochloride, 88 g. water, and 17 g. of 37% formaldehyde solution was adjusted to pH 3.5 and heated in a Parr shaker at 120° C. for 1 hour. After separation, the oil layer was washed neutral with water. GLC indicated two major peaks. The first peak (about 25% of the total) was identical to the starting aldehyde by retention time. The second peak (about 75%) was isolated in a pure state by GLC trapping and identified as 3,5,5-trimethyl-2-methylene hexanal by NMR, IR and Mass. Spec., $n_D^{20}$ 1.4522. The product had a pungent, green, minty note with valerian undertone.

EXAMPLE XXI

A mixture of 164 g. of n-decanal, 120 g. of 37% formaldehyde, 15 g. of 28% ammonium hydroxide and 2 g. of Ionol was adjusted to pH 9 and heated for 2 hours at 120° C. in a stirred autoclave. After separation, the oil layer was washed neutral with water and rushed-over to yield 84 g. of distillate testing 97.5% as 2-methylene decanal (by oximation). GLC indicated only a trace of the starting aldehyde.

The structural formula of each of the products of the above examples has been verified by NMR (Nuclear Magnetic Resonance), IR (Infra Red) and Mass Spectrum (Molecular Weight).

The NMR in each of the above examples was measured in carbon tetrachloride solution on Varian A–60 NMR spectrum.

The substances designated as "Ionol" and "Ionox" are oxidation inhibitors. Ionol is 2,6-ditertiary butyl paracresol; Ionox is 4-hydroxymethyl-2,6-ditertiary butyl phenol.

The formaldehyde referred to in the above examples is aqueous formaldehyde.

In the claims, where the expression "primary" or "secondary" amines is used, it is intended to cover not only the substances mentioned per se, but also the salts thereof.

The expression "ammonia and salts thereof" is intended to cover both an ammonium salt per se and a mixture of an ammonium salt with ammonia.

The above examples may be conducted at normal pressure or superatmospheric pressure.

I claim:

1. A compound selected from the group consisting of 3,7-dimethyl - 2 - methylene-6-octenal; 3,7-dimethyl-2-methylene-6-octenol; 2,3,7-trimethyl octanal; 3,7-dimethyl-2-methylene-7-hydroxyl octanal; 2-methylene-10-undecenal; and 3,5,5-trimethyl-2-methylene-hexanal.

2. 3,7-dimethyl-2-methylene-6-octenal having the formula

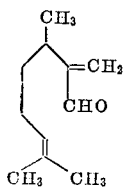

3. 3,7-dimethyl-2-methylene-6-octaneol having the formula

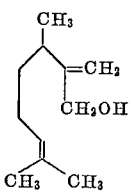

4. 2,3,7-trimethyl octanal having the formula

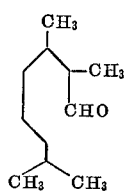

5. 3,7-dimethyl-2-methylene-7-hydroxy octanal having the formula

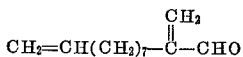

6. 2-methylene-10-undecenal having the formula $$CH_2=CH(CH_2)_7-\underset{\underset{CH_2}{\|}}{C}-CHO$$

7. 3,5,5-trimethyl-2-methylene hexanal having the formula

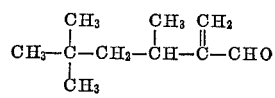

References Cited

UNITED STATES PATENTS 2,639,295   5/1953   Hagenmeyer _____ 260—601 X

OTHER REFERENCES

Beilstein, Org. Chemie, vol. 1, pp. 426, 452, 460, 745 and 748.

Beilstein, Org. Chem., vol. 1, Second Supplement, p. 884.

Oppenlander et al., Chem. Abstracts, vol. 52, col. 7221b, 1958.

LEON ZITVER, Primary Examiner

R. H. LILES, Assistant Examiner

U.S. Cl. X.R.

252—522; 260—602, 631.5, 632, 638

UNITED STATES PATENT OFFICE
CERTIFICATE OF CORRECTION

Patent No. 3,463,818  Dated August 26, 1969

Inventor(s) JACK H. BLUMENTHAL

It is certified that error appears in the above-identified patent and that said Letters Patent are hereby corrected as shown below:

Column 2, line 30, that portion of the formula reading
$$\begin{matrix} CH_2 \\ | \\ -C-CHO \end{matrix}$$
should appear as follows:
$$\begin{matrix} CH_2 \\ \| \\ -C-CHO \end{matrix};$$

Column 4, line 16, "octenal" should read --octenol--;

Column 4, lines 21-22, cancel beginning with "with sodium.. to and including "...as in Example IV".

Column 5, line 30, cancel "color" and substitute --odor-- therefor.

SIGNED AND SEALED
APR 28 1970

(SEAL)
Attest:

Edward M. Fletcher, Jr.
Attesting Officer

WILLIAM E. SCHUYLER, JR.
Commissioner of Patents